United States Patent
Asplund et al.

(10) Patent No.: US 8,867,241 B2
(45) Date of Patent: Oct. 21, 2014

(54) METHOD OF UPGRADING A PLANT FOR TRANSMITTING ELECTRIC POWER AND SUCH A PLANT

(75) Inventors: Gunnar Asplund, Solna (SE); Erik Koldby, Odense (DK)

(73) Assignee: ABB Technology AG, Zürich (CH)

( * ) Notice: Subject to any disclaimer, the term of this patent is extended or adjusted under 35 U.S.C. 154(b) by 727 days.

(21) Appl. No.: 13/139,921

(22) PCT Filed: Dec. 17, 2008

(86) PCT No.: PCT/EP2008/067747
§ 371 (c)(1),
(2), (4) Date: Sep. 6, 2011

(87) PCT Pub. No.: WO2010/069371
PCT Pub. Date: Jun. 24, 2010

(65) Prior Publication Data
US 2011/0310641 A1 Dec. 22, 2011

(51) Int. Cl.
*H02J 3/36* (2006.01)
(52) U.S. Cl.
USPC .......................................................... 363/35
(58) Field of Classification Search
USPC ...................................... 363/35, 37; 307/127
See application file for complete search history.

(56) References Cited

U.S. PATENT DOCUMENTS

| | | | | |
|---|---|---|---|---|
| 3,600,662 | A * | 8/1971 | Anwander | 363/35 |
| 4,459,492 | A * | 7/1984 | Rogowsky | 363/35 |
| 6,898,095 | B2 * | 5/2005 | Bijlenga et al. | 363/132 |
| 2008/0232145 | A1 | 9/2008 | Hiller et al. | |
| 2010/0046255 | A1 * | 2/2010 | Paajarvi | 363/35 |
| 2010/0091527 | A1 * | 4/2010 | Asplund | 363/35 |

FOREIGN PATENT DOCUMENTS

| | | |
|---|---|---|
| DE | 101 03 031 A1 | 7/2002 |
| WO | WO 2007/023064 A1 | 3/2007 |
| WO | WO 2007/073256 A1 | 6/2007 |

OTHER PUBLICATIONS

Qahraman et al., "Hybrid HVDC Converters and Their Impact on Power System Dynamic Performance", IEEE, Jun. 18, 2006, pp. 1-6, XP10942806.
Qahraman et al., "A VSC Based Series Hybrid Converter for HVDC Transmission", IEEE, May 1, 2005, pp. 458-461, XP002531709.

* cited by examiner

*Primary Examiner* — Jue Zhang
(74) *Attorney, Agent, or Firm* — Birch, Stewart, Kolasch & Birch, LLP

(57) ABSTRACT

A plant for transmitting electric power through HVDC includes two converter stations interconnected by a monopolar direct voltage network and each having an alternating voltage side for feeding electric power from one of said alternating voltage sides to the other. Each station has a line commutated converter. The plant is upgraded by making the direct voltage network bipolar, providing each station with a Voltage Source Converter and providing two switches for both line commutated converters or both Voltage Source Converters and a device configured to control said four switches.

11 Claims, 2 Drawing Sheets

21: Control
22: Control

US 8,867,241 B2

METHOD OF UPGRADING A PLANT FOR TRANSMITTING ELECTRIC POWER AND SUCH A PLANT

TECHNICAL FIELD OF THE INVENTION AND BACKGROUND ART

The present invention relates to a method of upgrading a plant for transmitting electric power through High Voltage Direct Current (HVDC), said plant comprising two converter stations interconnected by a pole conductor of a monopolar direct voltage network and each having an alternating voltage side for feeding electric power from one of said alternating voltage sides to the other, each station having a line commutated Current Source Converter having at least one phase leg with one end connected to said pole conductor of the direct voltage network and the other end having an earth connection in the form of a connection to an earth electrode or a return current conductor, as well as such an upgraded plant for transmitting electric power.

The invention is not restricted to any particular levels of powers transmitted on said direct voltage network or voltages thereof with respect to ground, but said voltages are above 1 kV and often above 100 kV.

The alternating voltage sides of the two stations are typically two alternating voltage networks, but any other type of alternating voltage side is conceivable, such as a connection to a generator of a power generating plant.

A plant according to the introduction is shown in appended FIG. 1, in which 1 and 2 are the two converter stations having each a line commutated Current Source Converter 3, 4 each having an alternating voltage side 5, 6 in the form of an alternating voltage network. The two stations are interconnected by a monopolar direct voltage network having a pole conductor 7, which may be an overhead line or a cable. The opposite ends of the converters have each an earth connection by being connected to an earth electrode 8, 9. However, this earth connection may just as well be a connection to a return current conductor on ground potential extending between the stations 1, 2 for conducting a return current therebetween. The current I may in such a plant only flow in one direction in said pole conductor from one station 1 to the other 2 and will then return through the earth electrodes or a said return current conductor, often in the form of a cable. Change of power feeding direction will take place by changing the polarity of the pole conductor. Governmental permissions are to be obtained for the electrode current flowing into the ground where the stations are located.

There are incentives for upgrading such a plant. "Upgrading" is to be interpreted as making constructional modifications improving any property of the operation or behaviour of such a plant.

A disadvantage of a plant of the type shown in FIG. 1 is that the power transmission therethrough will be unbalanced, which may cause disturbances.

WO2007/073256 discloses an HVDC network comprising two converter stations connected to each other by a first and a second transmission conductor. Each converter station comprises a line-commutated converter, i.e., a current source converter, and a switching arrangement capable of directing the flow of current through either conductor such that the potential of each conductor is the same irrespective of the effective transmission direction. The current flow is alternated between the first and the second conductor when the effective power transmission changes direction and the voltage is zero.

Qahrman and Gole (A VSC based series hybrid conveter for HVDC transmission, in Proceedings Canadian conference on electrical and computer engineering, 1 May 2005, pages 458-461,XCP002531709) discuss upgrading a conventional HVDC converter by adding a voltage source converter in series with an existing line commutated converter, resulting in a hybrid converter and a control system for the hybrid converter.

SUMMARY OF THE INVENTION

The object of the present invention is to provide a method making it interesting to upgrade a plant of the type described above.

This object is according to the invention obtained by providing such a method with the following steps:
said direct voltage network is made bipolar by interconnecting said stations by a further pole conductor,
each station is provided with a Voltage Source Converter having at least one phase leg, one end of which is connected to said further pole conductor and the other end to said earth connection and by that to said Current Source Converter, and
two switches are provided for both Voltage Source Converters of the plant and means are provided for controlling said four switches so as to enable to change which end of a said phase leg of each converter provided with said switches is connected to one of said pole conductors and which end is connected to said earth connection and by that to the other converter of the station.

By making the direct voltage network bipolar in this way a balanced power transmission is made possible, so that the stability of the operation of the plant may be increased.

Furthermore, by arranging Voltage Source Converters in the stations possible network reinforcements, which most probably would be necessary if instead Current Source Converters were used, could be avoided. Current Source Converters require rather strong networks, but Voltage Source Converters do not and may in fact feed a weak alternating voltage network or a network without a generation of its own (a dead alternating voltage network). This makes the present invention particularly interesting for the case of weak alternating voltage networks connected to the stations, but the invention is not restricted to that case.

However, the invention goes further than that, since just arranging a Voltage Source Converter 11, 12 in each station as shown in appended FIG. 2 would result in problems when the feeding direction of power transmitted between the stations is to be changed. This is due to the fact that the current may only flow in one direction in the pole conductor 7 connecting the Current Source Converters, whereas for the Voltage Source Converters the current direction in the other pole conductor 10 is to be changed when said feeding direction of power is to be changed. Thus, this will constitute no problem as long as the feeding direction of the power transmitted between the stations is kept the same, so that current will flow in one of the pole conductors 7 from one station to the other and then a return current will flow in the other pole conductor 10. However, when said power feeding direction is to be changed the current will flow in the same direction in the two pole conductors, which will result in an electrode current being twice as high as in the plant according to FIG. 1 or in a case of a return current conductor in a twice as high current therein. Such a change of power feeding direction may typically take place once a day, such as in the night, but it may also take place more seldom, such as a couple of times in a year. This would lead to a need of applying for extended governmental permissions for a higher electrode current level, which may possibly not be obtainable, and it would in any case have severe impacts on the ground and the environment.

However, the present invention takes care of the problem just described by providing said four switches and said means for control thereof making it possible to change the feeding direction of power transmitted between the stations without forcing any current into the earth electrode of the respective station. Thus, the main advantage of the present invention is that the currents in the two pole conductors may be balanced so that no current flows through the earth electrode.

According to an embodiment of the invention each station is provided with said means, which are configured to control said switches to switch for obtaining said change when the feeding direction of power transmitted between the stations is to be changed so as to maintain that current is flowing in one of the pole conductors from one station to the other and a return current is flowing in the other pole conductor. The advantages of arranging means with this property appear clearly from above.

According to another embodiment of the invention it is the Voltage Source Converter of each station that is provided with said two switches, and the plant is provided with said means, which are configured to control said switches so as to maintain the direction of the current flowing in each said pole conductor upon a said change of the feeding direction of the power transmitted between said stations. This means that a plant is obtained in which the current will always flow in the same direction in the two pole conductors of the bipolar direct voltage network irrespectively of the feeding direction of power transmitted between the two converter stations, so that electrode currents may be avoided.

According to another embodiment that is not part of the invention but useful for understanding the invention it is the Current Source Converter of each station that is provided with said two switches, and the plant is provided with said means, which are configured to control said switches so as to obtain a change of the direction of current flow in both said pole conductors upon a said change of feeding direction of the power transmitted between said stations. It is in this way obtained that the direction of the current will be changed in both pole conductors of the direct voltage network simultaneously when the feeding direction of power transmitted between said converter stations is changed, so that any electrode current may be avoided irrespectively of said feeding direction.

According to another embodiment of the invention each said station is provided with a said Voltage Source Converter, each said phase leg of which comprises a series connection of switching cells, each switching cell having on one hand at least two semiconductor assemblies connected in series and having each a semiconductor device of turn-off type and a free-wheeling diode connected in parallel therewith and on the other at least one energy storing capacitor, each said switching cell being configured to obtain two switching states by control of said semiconductor devices of each switching cell, namely a first switching state and a second switching state, in which the voltage across said at least one energy storing capacitor and a zero voltage, respectively, is applied across the terminals of the switching cell. It is pointed out that the present invention is not restricted to any type of Voltage Source Converters, but this type of Voltage Source Converter known through for example DE 101 03 031 A1 and WO 2007/023064 A1 and normally called a multi-cell converter or M2LC, has some particularly favourable properties. When such a Voltage Source Converter is used to transmit high powers this also means that high voltages are handled and the voltage of the direct voltage side of the converter is determined by the voltages across said energy storing capacitors of the switching cells. This means that a comparatively high number of such switching cells are to be connected in series or a high number of semiconductor devices, i.e. said semiconductor assemblies, are to be connected in series in each said switching cell, and a Voltage Source Converter of this type is particularly interesting when the number of the switching cells in said phase leg is comparatively high. A high number of such switching cells connected in series means that it will be possible to control these switching cells to change between said first and second switching state and by that already at a phase output of the converter obtain an alternating voltage being very close to a sinusoidal voltage. This may be obtained already by means of substantially lower switching frequencies than typically used in known Voltage Source Converters of the type shown in FIG. 1 in DE 101 03 031 A1 having switching cells with at least one semiconductor device of turn-off type and at least one freewheeling diode connected in anti-parallel therewith. This makes it possible to obtain substantially lower losses and also considerably reduces problems of filtering and harmonic currents and radio interferences, so that equipment therefor may be less costly.

According to another embodiment of the invention each said station is provided with a said Voltage Source Converter, each said phase of which comprises a series connection of current valves, each said current valve having on one hand a semiconductor device of turn-off type and a free-wheeling diode connected in anti-parallel therewith. Such a so-called two-level converter is simple to its construction and may in some applications be most preferred.

According to another embodiment of the invention each station is provided with two said switches in the form of high voltage breakers. High voltage breakers are suitable as said switches, since these should be able to withstand full voltage in both ends thereof. An advantage of using breakers as said switches is that they operate fast. It is pointed out that even non-mechanical switches, i.e. semiconductor switches, are conceivable, but they will most probably not constitute any attractive alternative.

According to another embodiment of the invention each station is provided with said switches in the form of SF6-breakers. Such breakers have been used in earlier HVDC applications as switches and the performance thereof has been very good.

The invention also relates to a plant for transmitting electric power obtained by carrying out the method according to the invention according to the appended independent plant claim, and the advantages thereof and of the plants defined in the dependent plant claims appear clearly from the above discussion of the different embodiments of the method according to the present invention.

It may be mentioned that according to one embodiment of the invention said converters are configured to have a direct voltage across said two pole conductors of the bipolar direct voltage network being between 1 kV and 1200 kV or between 10 kV and 1200 kV or between 100 kV and 1200 kV.

According to another embodiment of the invention the plant is configured to conduct a direct current of 200 A to 10 kA or 1 kA to 7 kA through said direct voltage network from one converter station to the other.

Further advantages as well as advantageous features of the invention will appear from the following description.

BRIEF DESCRIPTION OF THE DRAWINGS

With reference to the appended drawings, below follows a description of embodiments of the invention cited as examples.

In the drawings.

DETAILED DESCRIPTION OF EMBODIMENTS OF THE INVENTION

Figure 2:
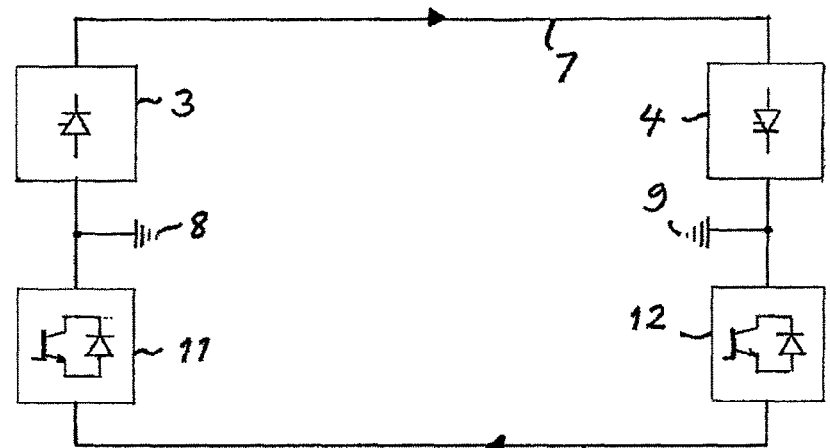
Figure 3:
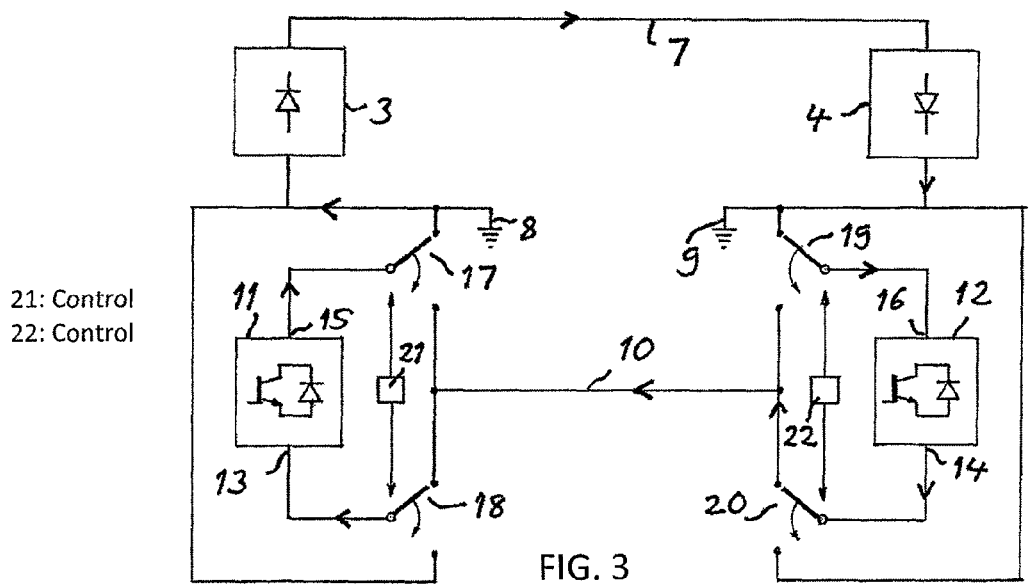

A method of upgrading a plant for transmitting electric power through High Voltage Direct Current (HVDC) of the type shown in FIG. 1 according to a first embodiment of the present invention will now be described with reference to FIG. 3. However, it is repeated that this and the other embodiment of the invention described below are equally applicable to a monopolar plant having a return current conductor on ground potential. The same reference numerals as used in FIGS. 1 and 2 will here be used for the corresponding elements. The plant to be upgraded has in each converter station a line commutated Current Source Converter 3, 4 and these are interconnected by a pole conductor 7 of a monopolar direct voltage network. The two converters 3, 4 have each at least one phase leg with one end connected to the pole conductor 7 and the other end connected to an earth electrode 8, 9.

The direct voltage network is made bipolar by interconnecting the two stations by a further pole conductor 10. Furthermore, each station is provided with a Voltage Source Converter 11, 12, one end 13, 14 of which is connected to said further pole conductor 10 and the other end 15, 16 to a respective earth electrode 8, 9 and by that to the Current Source Converter 3, 4 of the respective station.

Each Voltage Source Converter 11, 12 is provided with two switches 17-20, one connected to each end 13, 15 and 14, 16, respectively, of that converter. Control means 21, 22 are provided for controlling the switches so as to change which end 13 or 15 and 14 or 16 of a Voltage Source Converter and by that of the phase legs thereof is connected to the further pole conductor 10 and which of these ends is connected to the earth electrode and by that to the other converter of the station. More exactly, said means 21, 22 are configured to control the switches 17-20 to switch for obtaining said change when the feeding direction of power transmitted between the two stations of the plant is to be changed so as to maintain that current is flowing in the pole conductor 7 from the station 1 to the station 2 and then back to the station 1 through the pole conductor 10. Starting from the situation shown in FIG. 3 this takes place as follows. The current is flowing as shown through the arrows in FIG. 3. When feeding direction of the power is to be changed a polarity change is carried out in the pole conductor 7 and the direction of current through the Voltage Source Converters 11, 12 have to be changed. By controlling the switches 17-20 to switch the current will change direction through the Voltage Source Converters but the direction thereof in the pole conductor 10 will be maintained.

The switches are preferably breakers making them fast. SF6-breakers have shown good performances when previously used in HVDC applications and are therefore also a preferred choice here. The switches are not there for taking care of any fault conditions but for the normal operation of the plant, and they may typically be controlled once a day or even much more seldom, when the power feeding direction is to be changed.

Figure 1:
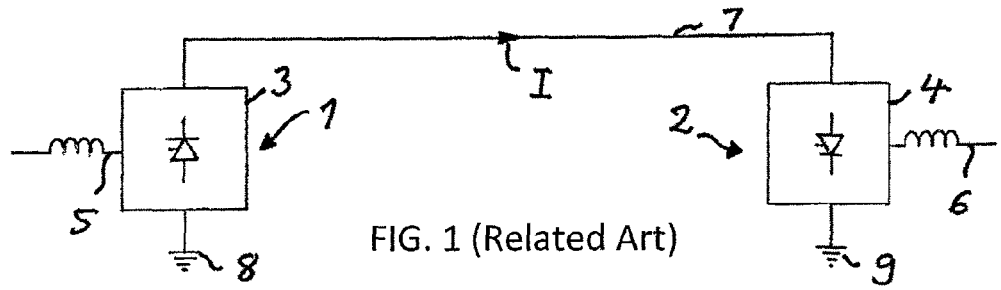
FIG. 1 is a very simplified view of a known plant for transmitting electric power through HVDC, which is to be upgraded by a method according to the present invention, FIG. 2 schematically illustrates an attempt not belonging to the present invention of upgrading a plant according to FIG. 1, FIG. 3 schematically illustrates a plant according to FIG. 1 upgraded through a method according to a first embodiment of the invention.
Figure 4:
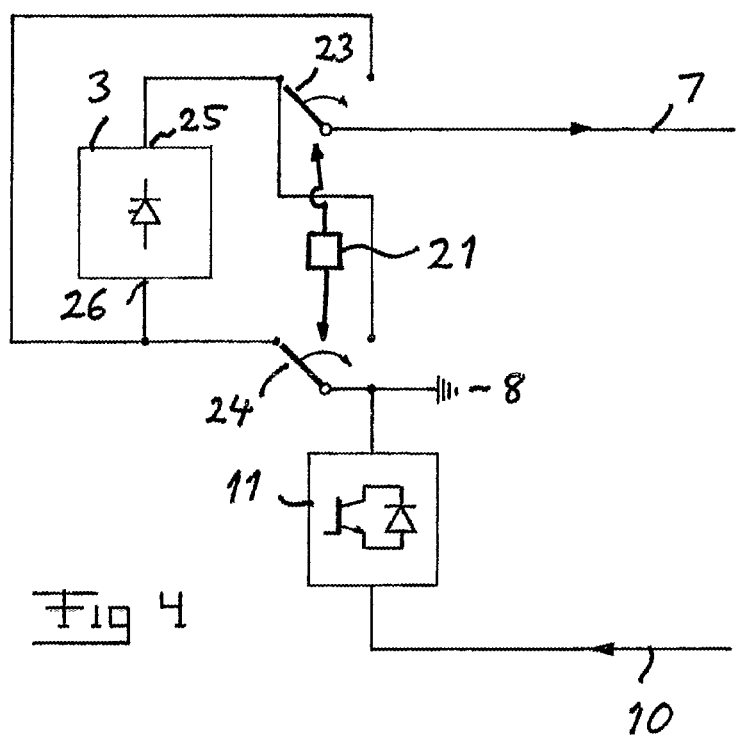
FIG. 4 is a view similar to FIG. 3 schematically illustrating a plant according to FIG. 1 upgraded through a method according to a second embodiment of the invention.

A method of upgrading a plant of the type shown in FIG. 1 according to a second embodiment that is not part of the invention but useful for understanding the invention is schematically illustrated through FIG. 4, which for the sake of simplicity only shows one of the converter stations, and the other will be designed correspondingly. This embodiment differs from the one according to FIG. 3 by the fact that the line commutated Current Source Converters 3, 4 are here instead each provided with two switches 23, 24 instead of the Voltage Source Converters 11, 12. This means that said means 21, 22 are configured to control the switches 23, 24 to change which one of the ends 25, 26 of the phase leg or phase legs of the Current Source Converter 23 is connected to the pole conductor and which one to the earth electrode 8 and by that the Voltage Source Converter.

Change of feeding direction of power transmitted between the stations will take place in the following way while avoiding any earth electrode current. Starting from the situation shown in FIG. 4 in which the current flows in the pole conductor 7 from the station 1 to the station 2 and then back to the station 1 through the pole conductor 10 change of power feeding direction takes place by changing the polarity of the pole conductor 7 and controlling the two switches 23, 24 to change the connections of said ends 25, 26 of the converter 3, so that the current flowing from the converter 3 will flow to the Voltage Source Converter.

The Voltage Source Converter 11 is at the same time controlled to change the current direction therethrough, so that the current will flow in the pole conductor 10 from the station 1 to the station 2 and then back to the station 1 through the pole conductor 7. Accordingly, the flowing direction of the current in the pole conductors of the direct voltage network is changed when power feeding direction is changed, so that any electrode current is extinguished.

The invention is of course not in any way restricted to the embodiments described above, but many possibilities to modifications thereof will be apparent to a person with ordinary skill in the art without departing from the scope of the invention as defined in the appended claims.

It is pointed out that equipment of a plant for transmitting power through HVDC having nothing to do with the present invention, such as harmonic filters, converter control units and the like, has been omitted in the figures. The Voltage Source Converters may be controlled in any known suitable way, such as for instance by Pulse Width Modulation. The number of the phase legs of the converters is also optional and is typically three for generating a three-phase alternating voltage on the alternating voltage side thereof. However, a one-phase voltage is also conceivable.

The invention claimed is:

1. A method of upgrading a plant for transmitting electric power through High Voltage Direct Current (HVDC), said plant comprising two converter stations interconnected by a pole conductor of a monopolar direct voltage network and each having an alternating voltage side for feeding electric power from one of said alternating voltage sides to the other, each station having a line commutated Current Source Converter having at least one phase leg with one end connected to said pole conductor of the direct voltage network and the other end having an earth connection in the form of a connection to an earth electrode or a return current conductor, the method comprising:

interconnecting said stations by a further pole conductor such that said direct voltage network is made bipolar, and providing each station with a Voltage Source Converter having at least one phase leg, one end of which is connected to said further pole conductor and the other end to said earth connection and by that to said Current Source Converter, the method further comprising:

providing two switches for both Voltage Source Converters of the plant, and providing means for controlling said four switches so as to enable to change, when the feeding direction of power transmitted between said stations is to be changed, which end of a said phase leg of each converter provided with said switches is connected to one of said pole conductors and which end is connected to said earth connection and by that to the other converter of the station so as to maintain the direction of the current flowing in each said pole conductor upon a said change of the feeding direction of the power transmitted between said stations.

2. A method according to claim 1, wherein each said station is provided with said Voltage Source Converter, each said phase leg of which comprises a series connection of switching cells, each switching cell having on one hand at least two semiconductor assemblies connected in series and having each a semiconductor device of turn-off type and a free-wheeling diode connected in parallel therewith and on the other at least one energy storing capacitor, each said switching cell being configured to obtain two switching states by control of said semiconductor devices of each switching cell, namely a first switching state and a second switching state, in which the voltage across said at least one energy storing capacitor and a zero voltage, respectively, is applied across the terminals of the switching cell.

3. A method according to claim 1, wherein each said station is provided with said Voltage Source Converter, each said phase leg of which comprises a series connection of current valves, each said current valve having on one hand a semiconductor device of turn-off type and a free-wheeling diode connected in anti-parallel therewith.

4. A method according to claim 1, wherein each station is provided with two said switches in the form of high voltage breakers.

5. A method according to claim 4, wherein each station is provided with said switches in the form of SF6-breakers.

6. A method according to claim 1, wherein the further conductor is a cable.

7. A plant for transmitting electric power through High Voltage Direct Current (HVDC) comprising two converter stations interconnected by a bipolar direct voltage network and each having an alternating voltage side for feeding electric power from one of said alternating voltage sides to the other, each station comprising:

a line commutated Current Source Converter having at least one phase leg with one end connected to a first pole conductor of the direct voltage network and the other end having an earth connection in the form of a connection to an earth electrode or a return current conductor, and a Voltage Source Converter having at least one phase leg, one end of which is connected to a second pole conductor of the bipolar direct voltage network and the other end to said earth connection and by that to said Current Source Converter, the plant further comprising:

two switches for both Voltage Source Converters, and means for controlling said four switches so as to enable to change, when the feeding direction of power transmitted between said stations is to be changed, which end of a said phase leg of each converter provided with said switches is connected to one of said pole conductors and which end is connected to said earth connection and by that to the other converter of the station so as to maintain the direction of the current flowing in each said pole conductor upon said change of the feeding direction.

8. A plant according to claim 7, wherein said two switches of each station are high voltage breakers.

9. A plant according to claim 7, wherein said converters are configured to have a direct voltage across said two pole conductors of the bi-polar direct voltage network being between 1 kV and 1200 kV or between 10 kV and 1200 kV or between 100 kV and 1200 kV.

10. A plant according to claim 7, wherein it is configured to conduct a direct current of 200 A to 10 kA or 1 kA to 7 kA through said direct voltage network from one converter station to the other.

11. A plant according to claim 7, wherein the further conductor is a cable.

* * * * *